US008423554B2

(12) United States Patent
Garcia et al.

(10) Patent No.: US 8,423,554 B2
(45) Date of Patent: Apr. 16, 2013

(54) CONTENT CATEGORY SCORING FOR NODES IN A LINKED DATABASE

(75) Inventors: Fermin Otniel Garcia, San Diego, CA (US); Roberto Romero Saldivar, Tijuana (MX); Jose Roberto Zavala Zazueta, Tijuana (MX)

(73) Assignee: Sosvia, Inc., San Diego, CA (US)

( * ) Notice: Subject to any disclaimer, the term of this patent is extended or adjusted under 35 U.S.C. 154(b) by 541 days.

(21) Appl. No.: 12/498,407

(22) Filed: Jul. 7, 2009

(65) Prior Publication Data

US 2011/0010365 A1    Jan. 13, 2011

(51) Int. Cl.
*G06F 7/00* (2006.01)
*G06F 17/30* (2006.01)

(52) U.S. Cl.
USPC .......................................................... 707/738

(58) Field of Classification Search .................. 707/736, 707/738
See application file for complete search history.

(56) References Cited

U.S. PATENT DOCUMENTS

| | | | |
|---|---|---|---|
| 6,285,999 B1 * | 9/2001 | Page | 1/1 |
| 6,738,678 B1 * | 5/2004 | Bharat et al. | 700/48 |
| 6,754,873 B1 | 6/2004 | Law et al. | |
| 6,799,176 B1 * | 9/2004 | Page | 1/1 |
| 7,058,628 B1 * | 6/2006 | Page | 1/1 |
| 7,117,206 B1 * | 10/2006 | Bharat et al. | 1/1 |
| 7,783,639 B1 * | 8/2010 | Bharat et al. | 707/736 |
| 8,145,636 B1 * | 3/2012 | Jeh et al. | 707/736 |

OTHER PUBLICATIONS

Haveliwala, "Topic-Sensitive PageRank: A Context-Sensitive Ranking Algorithm for Web Search", Dec. 2002, IEEE, pp. 1-21.*
International Application No. PCT/US2010/041135, International Search Report mailed Oct. 18, 2010.
International Application No. PCT/US2010/041135, Written Opinion mailed Oct. 18, 2010.
Haveliwala, et al., "Topic-Sensitive PageRank: A Context-Sensitive Ranking Algorithm for Web Search", IEEE Transactions on Knowledge and Data, Engineering, IEEE Service Center, Los Alamitos, CA, US (XP002398663 ISSN: 1041-4347), sections 1-3, Aug. 1, 2008, pp. 1-22.
Richardson, M. et al. "The Intelligent Surfer: Probabilistic Combination of Link and Content Information in Pagerank", Advances in Neural Information Processing Systems 14 [Neural Information Processing Systems: Natural and Synthetic, NIPS Dec. 3, 2001 ( XP002603555), Vancouver, British Columbia, Canada Retrieved from the Internet: URL:http://books.nips.cc/pap Aug. 12, 2001.
International Application No. PCT/US2010/041135, International Preliminary Report on Patentability mailed Jan. 19, 2012.

* cited by examiner

*Primary Examiner* — Rehana Perveen
*Assistant Examiner* — Hung Havan
(74) *Attorney, Agent, or Firm* — Kilpatrick Townsend & Stockton LLP (57) ABSTRACT

Systems, methods and computer program products are provided for assigning content category scores to nodes of a linked database. The nodes of the linked database include linking nodes and linked nodes. Each linking node is assigned a linking node score for each content category. The linking node score for each content category represents a degree of relevancy of the linking node to the content category. Each of the linked nodes is linked to by at least one of the linking nodes. Each linked node is assigned a content category score for each content category. The content category score for each content category is based on the linking node score for said content category of each linking node that links to the linked node.

15 Claims, 7 Drawing Sheets

Node 1
Keywords = Keyword 1, Keyword 2
Keyword Count = 2
Forward Links = Node 2, Node 3, Node 4
Forward Link Count = 3
Backward Links = Node 2, Node 4

Node 2
Keywords = Keyword 2, Keyword 3, Keyword 4
Keyword Count = 3
Forward Links = Node 1
Forward Link Count = 1
Backward Links = Node 1

Node 3
Keywords = Keyword 2, Keyword 3
Keyword Count = 2
Forward Links = N/A
Forward Link Count = 0
Backward Links = Node 1, Node 4

Node 4
Keywords = Keyword 1, Keyword 2, Keyword 3
Keyword Count = 3
Forward Links = Node 1, Node 3
Forward Link Count = 2
Backward Links = Node 1

Content Categories:
Category 1 (C1)
Category 2 (C2)
Category 3 (C3)
Category 4 (C4)

Content Category Damping Factors:
$DF_{C1} = 0.2$
$DF_{C2} = 0.5$
$DF_{C3} = 0.3$
$DF_{C4} = 0.5$

CONTENT CATEGORY SCORING FOR NODES IN A LINKED DATABASE

TECHNICAL FIELD

The present invention relates generally to techniques for analyzing and scoring nodes in a linked database based on their relevance to selected content categories. More particularly, the present invention relates to methods for assigning content category scores to nodes in a linked database, such as any database of documents containing hyperlinks or other citations.

BACKGROUND OF THE INVENTION

Internet search engines, database management systems and other information retrieval systems are designed to retrieve information that corresponds to a user's query. Typically, the user's query is specified as a set of keywords and the information retrieval system's job is to retrieve documents, files, etc. that contain as many of the specified keywords as possible. Information retrieval systems that operate on large databases can often produce large quantities of search results corresponding to the keywords in a query. Naturally, many of the search results will use the specified keywords in contexts other than those intended by the user. Therefore, many of the search results will be irrelevant to and unwanted by the user. Recognizing this issue, many current information retrieval systems attempt to assess or rank the relevancy of their search results before presenting them to the user.

For example, some information retrieval systems approximate a relevancy score for retrieved documents based upon factors such as how recently each document has been updated, the proximity of the specified keywords to the beginning of each document, or whether the specified keywords are included in the title, links (e.g., anchor text) or metadata. Other systems approximate a relevancy score based on the apparent popularity or importance of a retrieved document, which may be measured by counting the number of other documents that link to the retrieved document. Some systems assess the importance of the retrieved document not only based on the number of links to it, but also the importance of the documents that link to it. See, for example, U.S. Pat. No. 6,285,909. While such methods for approximating relevancy of search results can produce useful information, they remain unable to assess whether the retrieved documents contain content that the user is actually looking for.

It is commonly recognized that performing searches on information sets that have been categorized according to content is more likely to produce larger quantities of relevant search results, as compared to performing searches on uncategorized data sets. However, categorizing vast databases (e.g., the World Wide Web) is generally thought to require a painstaking process that involves considerable human intervention. The difficulty of categorizing large data sets that are accessed by a large number of users is compounded by the fact that the included data is constantly being changed. Accordingly, what is needed are efficient systems and methods for assigning content category scores to large and dynamic data sets with minimal human involvement, to thereby enhance the relevancy of search results produced by an information retrieval system.

SUMMARY OF THE INVENTION

The present invention meets the above described need by providing systems, methods and computer program products for assigning content category scores to nodes of a linked database. For example, the present invention may be embodied as an information retrieval system executing at least one program module for scoring nodes in a linked database based on a plurality of content categories. The invention may also be embodied as a computer implemented method or a computer program product having stored thereon at least one program module for scoring nodes in a linked database based on a plurality of content categories.

The nodes of the linked database include linking nodes and linked nodes. A plurality of linking nodes in the linked database are identified. Each linking node is assigned a linking node score for each content category. The linking node score for each content category represents a degree of relevancy of the linking node to the content category. A plurality of linked nodes in the linked database are also identified. Each of the linked nodes is linked to by at least one of the linking nodes. Each linked node is assigned a content category score for each content category. The content category score for each content category is based on the linking node score for said content category of each linking node that links to the linked node. In some embodiments, the content category score for each content category is based on the sum of each linking node score for said content category multiplied by a damping factor for said content category.

At least one of the linking nodes may be a seed node containing a number of forward links and having an assigned seed node score for each content category. The linking node score assigned to the seed node for each content category may be based on the seed node score assigned to said seed node for said content category divided by the number of forward links in said seed node. Similarly, at least one of the linking nodes may be a branch node that is linked to by at least one of the other linking nodes. The branch node contains a number of forward links and has a calculated branch node score for each content category. The branch node score for each content category is based on each linking node score for said content category of the at least one other linking nodes. The linking node score assigned to the branch node for each content category is based on the branch node score assigned to said branch node for said content category divided by the number of forward links in said branch node.

At least one unique keyword may be identified in each seed node and, for each identified unique keyword in each seed node, a keyword score may be determined for each content category. The keyword score for each content category may be based on the seed node score for said content category divided by the number of unique keywords in the seed node. An aggregate keyword score may be determined for each content category by aggregating the keyword scores for each content category of all of the seed nodes. If it is determined that a selected content category score for a selected linked node in a selected content category does not exceed a threshold value, the selected content category score may be replaced with a leaf node score that is based on an average of the aggregate keyword scores in the selected content category assigned to any of the unique keywords contained in the node.

These and other aspects and features of the invention will be described further in the detailed description below in connection with the appended drawings and claims.

DETAILED DESCRIPTION OF EXEMPLARY EMBODIMENTS

Reference will now be made in detail to various and alternative exemplary embodiments and to the accompanying figures, in which like numerals represent substantially identical elements. Each exemplary embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

The present invention provides systems, methods and computer program products for assigning content category scores to nodes in a linked database. A linked database may be a single data storage device or may include any number of distributed data storage devices, servers and/or other computing devices. Examples of linked databases include the World Wide Web and any other type of hypermedia database. A linked database can be represented as a directed graph of N nodes, where each node corresponds to a web page, document or other object and where the directed connections between nodes correspond to links (e.g., hyperlinks or citations) from one node to another. A given node may have a set of forward links that connect it to children nodes, and a set of backward links that connect it to parent nodes.

Figure 1:
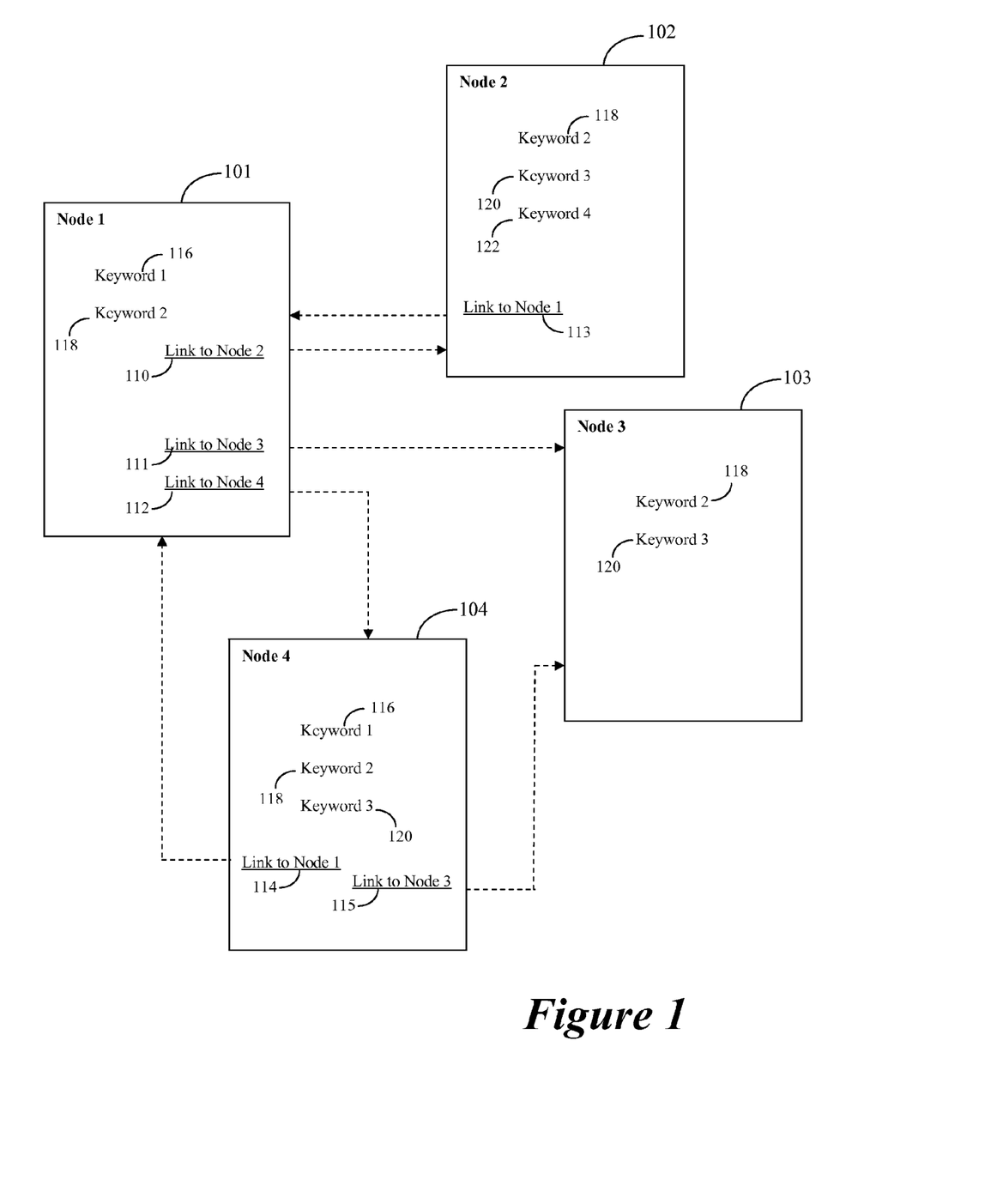
FIG. 1 is a block diagram illustrating the relationships between four nodes in a hypothetical linked database.

FIG. 1 shows the relationships between four nodes, Node 1 101, Node 2 102, Node 3 103 and Node 4 104, in a hypothetical linked database. As shown in this example, Node 1 101 contains forward links 110-112 to three child nodes, Node 2 102, Node 3 103 and Node 4 104, meaning that each such child node has a backward link to parent Node 1 102. Similarly, Node 2 102 is shown as containing a forward link 113 to child Node 1 101, which thus has a backward link to parent Node 2 102. Node 3 103 does not contain any forward links and is therefore not a parent to any other node. Node 4 104 contains forward links 114-115 to two child nodes, Node 1 101 and Node 3 103, each of which thus has a backward link to parent Node 4 104. Accordingly, a node in a linked database can have a parent and/or a child relationship with any other node. For ease of reference, any node that contains a forward link to another node may be referred to herein as a "linking node," regardless of whether that linking node is a parent and/or child node in relation to any other node. Similarly, any node that is linked to by another node may be referred to herein as a "linked node". A node may be both a linking node and a linked node.

Each database node may contain one or more keywords, e.g. in its body, headers, metadata, etc. In the example of FIG. 1, Node 1 101 contains Keyword 1 116 and Keyword 2 118; Node 2 102 contains Keyword 2 118, Keyword 3 120 and Keyword 4 122; Node 3 103 contains Keyword 2 118 and Keyword 3 120; and Node 4 104 contains Keyword 1 116, Keyword 2 118 and Keyword 3 120. In accordance with certain embodiments of the invention, each node in a linked database is parsed and/or indexed to identify certain attributes, including any keywords, forward links and backward links associated therewith. The attributes of the node are used to assign a content category score to the node, as will be explained herein.

Those skilled in the art will appreciate that the hypothetical nodes 101-104 shown in FIG. 1 are overly simplistic and are for purposes of illustration only. In practice, nodes of a linked database may include hundreds or even thousands of forward links, backward links and/or keywords. In addition, a linked database may include hundreds, thousands, millions or even more nodes. Embodiments of the present invention are particularly useful for enhancing the relevancy of search results obtained from linked databases whose nodes have a large variation in content and quality.

Figure 2:
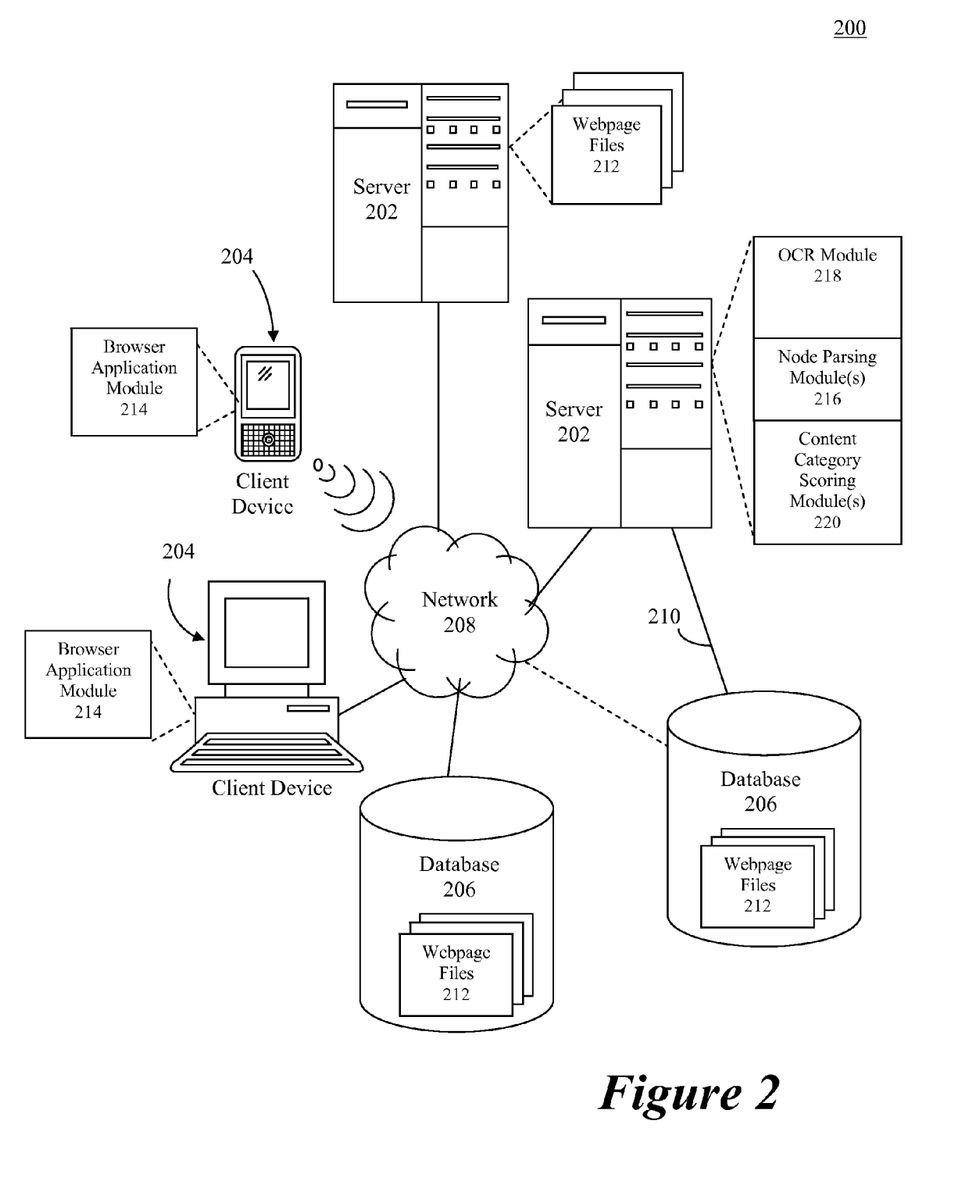
FIG. 2 is a block diagram illustrating an exemplary operating environment for implementation of various embodiments of the present invention.

The present invention may be implemented using any combination of computer software, firmware or hardware. For example, various embodiments of the present invention may be practiced in the context of distributed computing environments comprising multiple network computing devices, as illustrated in FIG. 2. In an exemplary computing environment 200, various computing devices (e.g., servers 202, client devices 204 and databases 206) can be interconnected via a network 208. The network 208 may comprise any telecommunication and/or data network through which network computing devices can exchange information, including a LAN, a WAN and any combination thereof. Portions of the network 208 may be wired and other portions may be wireless.

A network computing device can be any computing device capable of transmitting and receiving information over a network 208. In general, a computing device includes a processing unit, a system memory, and a system bus that couples various system components, including the system memory, to the processing unit. The system bus can comprise any of several types of bus structures, including a memory bus or memory controller, a peripheral bus, or a local bus, using any of a variety of bus architectures. The system memory may comprises a read-only memory (ROM) and a random access memory (RAM). A basic input/output system (BIOS) containing the basic routines that help to transfer information between elements within the computing device, such as during start-up, is typically stored in the ROM.

In addition to ROM and RAM, a computing device may include one or more other machine readable storage device, such as a hard disk drive for reading from and writing to a hard disk, a magnetic disk drive for reading from or writing to a removable magnetic disk, such as a floppy disk, and/or an optical disk drive for reading from or writing to a removable optical disk, such as a CD, DVD or other optical media, etc. Machine readable storage devices are typically connected to the system bus by appropriate interfaces. Machine readable storage devices can provide nonvolatile storage of computer-executable instructions, data structures, program modules (e.g., an operating system, application, libraries, etc.) and other data. Program modules include computer-executable instructions representing routines, sub-routines, programs, objects, components, data structures, etc., for causing a processing unit to perform particular tasks or implement particular abstract data types.

A computing device typically includes one or more input devices, such as a keyboard and/or a pointing device, that can be used to enter commands and information to the computing device. Similarly, a computing device typically include one or more output devices, such as a display device. A computing device may be connected to the network 208 through a network interface, adapter, modem or other suitable communications device. Input devices, output device and communications devices may be connected to the processing unit through an appropriate interfaces coupled to the system bus.

As shown in FIG. 2, a network computing device can be a server 202, a client device 204, or a dedicated storage facility, such as a database 206. A server 202 may execute software for interacting with a database 206 and other network computing devices via the network 208 and/or a direct data link 210. A server 202 may host (i.e., provide access to) webpage files 212, which may be stored in a local storage device (e.g., RAM and/or ROM) of the server 202 and/or in one or more database 206 or other network device. A collection of webpage files 212, stored in one or more database 206, server 202 of other network device are considered, for purposes of the present invention, to be nodes in a linked database.

A client device 204 can be a desktop computer, a laptop computer, a wireless network device, such as a personal digital assistant ("PDA") or a smart phone, a handheld computer, or any other wired or wireless processor-driven device capable of communicating with the resources of the network 208. A client device 204 may execute a program module referred to herein as browser application module 214, such as Microsoft Internet Explorer, Firefox, Netscape, Google Chrome, or another suitable application for interacting with webpage files 212. As is well known in the art, webpage files 212 can comprise text, graphic, images, sound, video, scripts, applications, applets, and other multimedia or data objects, that can be transmitted via the network 208. For example, webpage files 212 can comprise one or more HyperText Markup Language (HTML) files. Some webpage files 212 include hyperlinks or other citations to other webpage files.

Figure 3A:
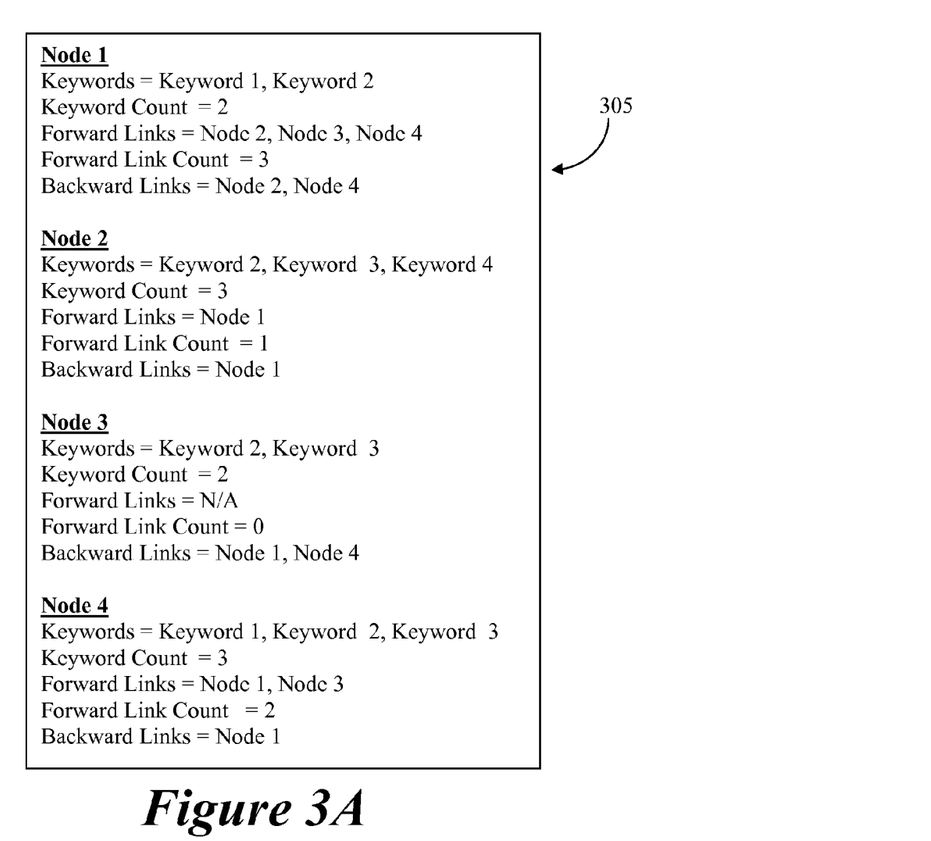
FIG. 3A is a block diagram illustrating a summary of the results that may be obtained by parsing the hypothetical nodes of FIG. 1 to identify certain characteristics thereof and FIG. 3B shows a simplistic set of content categories and their corresponding damping factors for such hypothetical nodes.

A server 202 or other network computing device may execute one or more software program modules, referred to herein as Node Parsing Module(s) 216, for parsing and/or indexing webpage files 212 to identify certain attributes thereof, such as keywords, forward links and backward links. In some cases, the server 202 may include an optical character recognition program module (e.g., OCR Module 218) or the like for identifying keywords and other attributes within non-textual portions of a webpage file 212. Methods for parsing and indexing webpage files 212 are well known in the art and are therefore not explained in detail herein. FIG. 3A shows, by way of example only, a summary of the results 305 that may be obtained by parsing the hypothetical nodes of FIG. 1 to identify certain characteristics thereof. These results 305 may be stored in a local storage device of a server 202 and/or in a network database 206.

In accordance with the present invention, a server 202 or other network computing device may also execute one or more software program modules, referred to herein as the Content Category Scoring Module(s) 220, for scoring nodes of a linked database. In certain embodiments, the Content Category Scoring Module(s) 220 comprise computer-executable instructions for performing some or all of the methods described hereinafter with reference to FIGS. 4-7. The Content Category Scoring Module(s) 220, whether embodied in software or firmware, may be stored in one or more machine readable storage devices, thereby making a computer program product in accordance with the invention. The computer program product containing the computer-executable instructions may be used by either executing the code directly from the storage device, by copying the instructions from the storage device into another storage device, such as a hard disk, RAM, etc., or by transmitting the instruction over the network 208 for execution by a remote network computing device.

Figure 4:
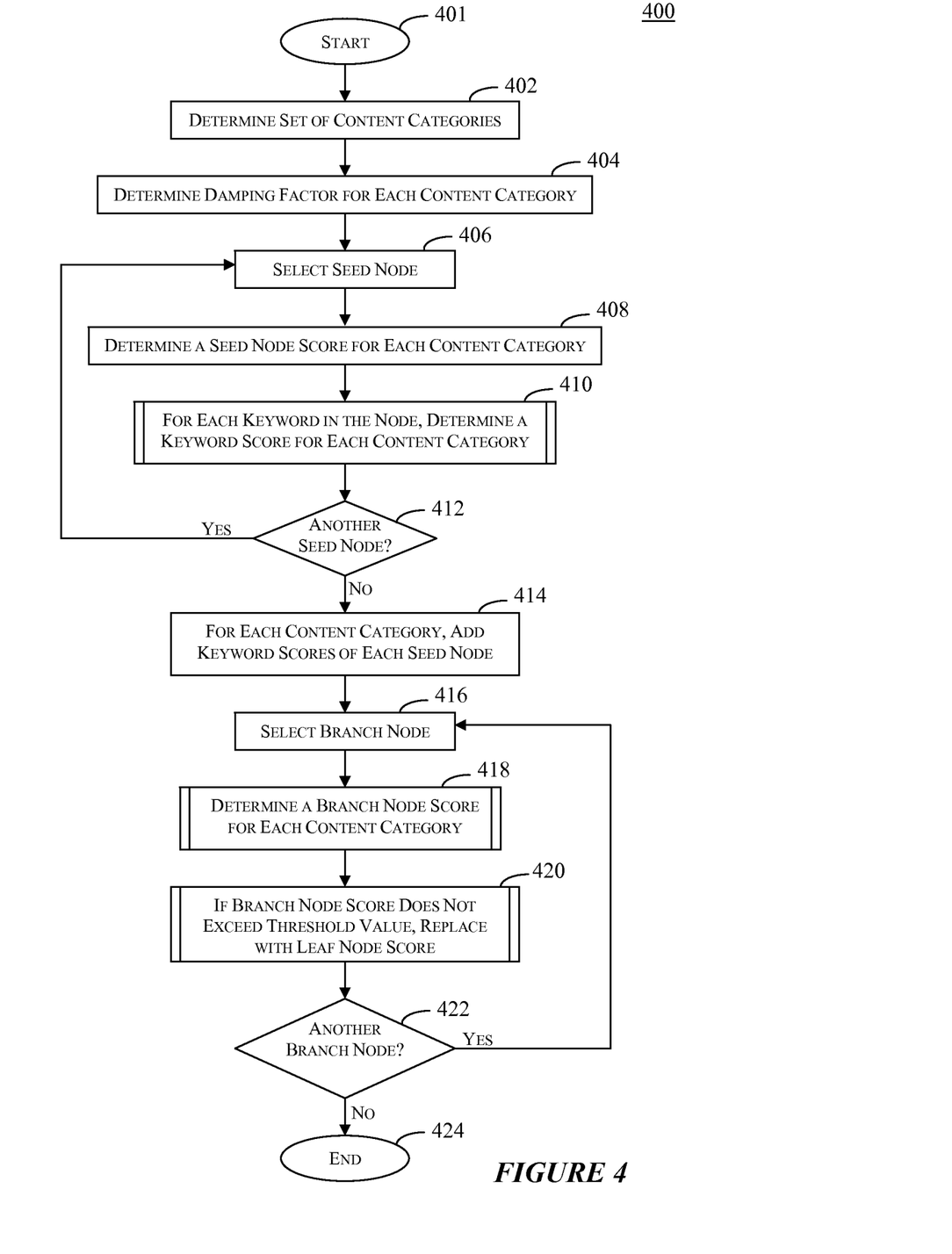
FIG. 4 is a flow chart illustrating an exemplary method for assigning content category scores to nodes of a linked databases in accordance with certain embodiments of the present invention.

FIG. 4 is a flow chart illustrating an exemplary method 400 for assigning content category scores to nodes of a linked databases in accordance with certain embodiments of the present invention. The method 400 begins at step 401 and proceeds to step 402, where a set of content categories is determined. The set of content categories includes all categories of content upon which the nodes of the database will be evaluated and scored. In other words, each database node will be analyzed to determine its relevance, if any, to each content category in the set. For example, content categories can include general categories of content such as: "automotive," "industrial," "medical," "sports," "business," "technology," "adult," etc.

Any number of categories and/or subcategories can be included in the set. However, given that processing time is directly affected by the number of content categories, it may be preferable in some embodiments to keep the number of content categories in the set relatively small. Overall, a balance between greater specificity (i.e., a larger number of more narrowly defined content categories) and faster processing (i.e., a smaller number of more generally defined content categories) will need to be achieved depending on the desired performance characteristic of the system. The set of content categories may be determined each time the exemplary method 400 is invoked, or may be predetermined prior to invoking the exemplary method 400. The set of content categories may be determined by a user (e.g., system administrator or operator), through an automated process (e.g. based on metadata or other characteristics of the database nodes to be scored, analysis of popular search queries, etc.) or through some combination thereof.

After the set of content categories is determined, the method proceeds to step 404, where a damping factor is determined for each content category in the set. A damping factor is a percentage used to reduce the content category scores of linked nodes in each iteration of the scoring process. Each content category can have a configurable damping factor that can be adjusted at will, either through a manual or automatic process. In certain embodiments, the damping factors is a constant ranging from 0 to 1. In other embodiments, any range may be used for damping factors or damping factors may be omitted. Damping factors may be assigned to the content categories each time the exemplary method 400 is invoked, or may be pre-assigned prior to invoking the exemplary method 400.

In certain embodiments, the damping factor for a particular content category may be based on an analysis of the average rate of irrelevancy for nodes seeded in that category. The average rate of irrelevance may be approximated by the number of link iterations it tends to take before a node seeded in the particular category branches out to a node that is not relevant to that category. For example, if a node that is seeded for an "Educational" category takes, on average, about 10 link iterations before the content of the eventual linked node stops being educational, the damping factor for the Educational category may be set to 0.60 (60%), meaning that it will take about 10 branches before the seed node score stops having an effect on the content category score of the linked node.

Figure 3B:
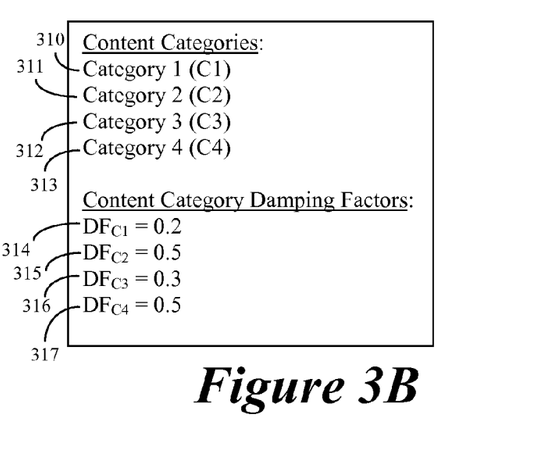

Following the previous example, FIG. 3B shows a simplistic set of content categories and their corresponding damping factors for the hypothetical nodes of FIG. 1. The set of categories includes Category 1 310, Category 2 311, Category 3 312 and Category 4 313. Category 1 310 has a damping factor, $DF_{C1}$ 314, of 0.2. Category 2 311 has a damping factor, $DF_{C2}$ 315, of 0.5. Category 3 312 has a damping factor, $DF_{C3}$ 316, of 0.3. Category 4 313 has a damping factor, $DF_{C4}$ 317, of 0.5.

Returning to FIG. 4, at step 406 a seed node is selected from the linked database. In accordance with certain embodiments of the present invention, content category scores are calculated differently for "seed nodes," "branch nodes" and "leaf nodes." A seed node is a node that is assigned an initial content category score, referred to herein as a "seed node score," in each content category. Each seed node score is based on a perceived relevance of the node, by itself, to the particular content category. In contrast, a branch node is assigned a content category score, referred to herein as a "branch node score," that accounts for the content category scores of all other nodes that link to the branch node. Leaf nodes are branch nodes whose calculated branch node scores do not exceed a particular threshold value and are thus replaced by a "leaf node score".

After selecting the first seed node at step 406, the exemplary method proceeds to step 408, where a seed node score is determined for each content category in the set of content categories. Any node in the database can be treated as a seed node. Seed nodes may be identified manually by a user, or through an automated or semi-automated process. For example, all nodes meeting certain predetermined or configurable criteria may be treated as seed nodes. In other embodiments, a certain percentage of all nodes in a linked database may be randomly selected as seed nodes.

Similarly, seed node scores may be determined by a user or through an automated or semi-automated process. Seed node scores represent a perceived relevance of the node to each content category. For example, if the node contains many keywords and/or other content that appear or are known to be relevant to a particular content category, the seed node score assigned to the node for that content category should be relatively high. If the node contains a minimal amount of keywords that appear or are known to be relevant to a particular content category, the seed node score assigned to the node for that content category should be relatively low. If the node does not contain content relevant to a particular category, the seed node score assigned to the node for that content category should be zero. In certain embodiments, seed node scores range from 0 to 10. However, other ranges may be used in other embodiments. By way of illustration, and not limitation, Table 1 below shows seed node scores that may be assigned to the hypothetical Node 1 101 of FIG. 1. These scores are meant to indicate that Node 1 101 includes keywords and/or other content that is highly relevant to Category 1 310 and moderately relevant to Category 4 313, but does not include content relevant to Category 2 311 or Category 3 312. In this example, Node 1 101 is the only node chosen as a seed node.

TABLE 1

Seed Node Scores

|  | Category 1 | Category 2 | Category 3 | Category 4 |
|---|---|---|---|---|
| Node 1 | 10 | 0 | 0 | 6 |

Figure 5:
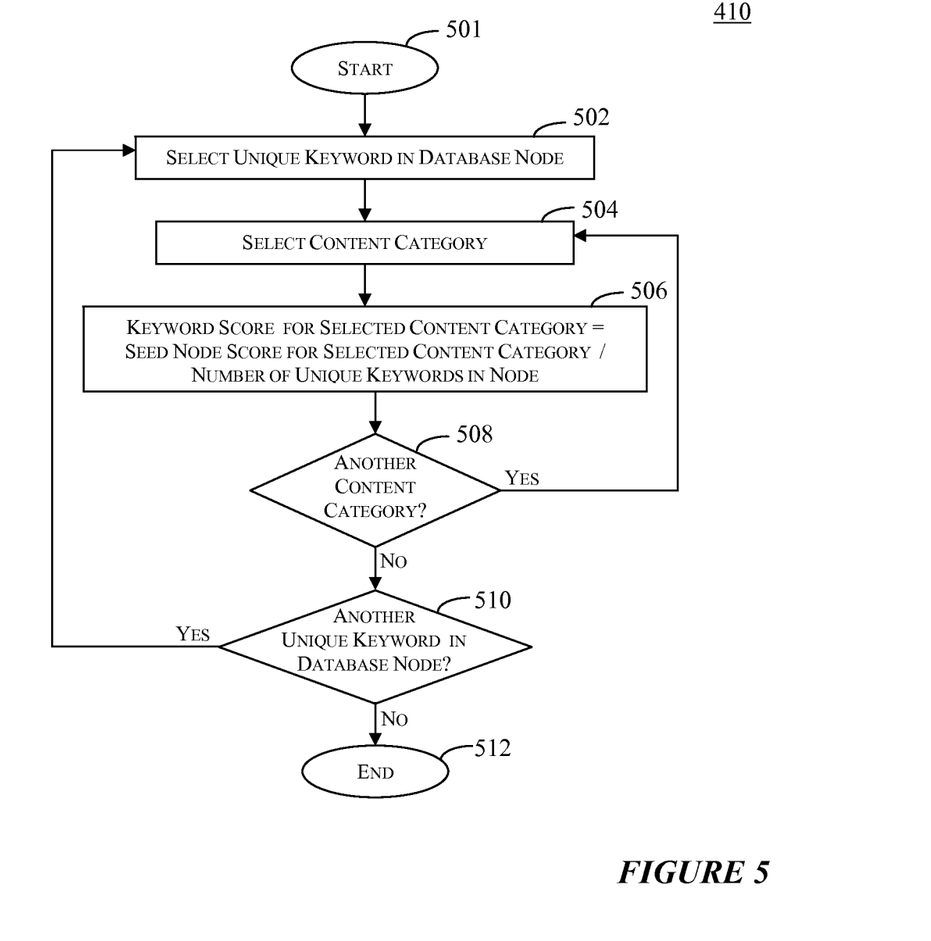
FIG. 5 is a flow chart illustrating an exemplary method for determining keyword scores for each unique keyword contained in a seed node, in accordance with certain embodiments of the present invention.

After seed node scores are determined for each content category, the exemplary method moves to step 410, where a keyword score is determined for each unique keyword contained in the seed node for each content category. An exemplary method for performing step 410 is illustrated in FIG. 5. The exemplary method of FIG. 5 begins at step 501 and proceeds to step 502, where a first unique keyword is selected. Preferably, common words, such as "a," "an," "the," etc. are excluded from the set of unique keywords that are assigned keyword scores. After selecting a keyword, a content category is selected at step 504. Then, at step 506 a keyword score is calculated for the selected content category. In certain embodiments, the keyword score for the selected content category is equal to the damping factor of the selected content category multiplied by the seed node score for selected content category divided by the number of unique keywords in the seed node.

Generally, the following equation can be used to calculate keyword scores for selected content categories:

$$KS(i)_{CiNi} = DF_{Ci} * CS_{CiNi} / KC_{Ni}$$

where $KS(i)_{CiNi}$ is the keyword score of a selected keyword for a selected content category in a selected seed node, $DF_{Ci}$ is the damping factor of the selected content category, $CS_{CiNi}$ is the seed node score of the selected seed node for the selected content category, and $KC_{Ni}$ is the keyword count for the selected seed node. So, assuming that Keyword 1 116 is the first keyword selected for Node 1 101 in the example herein, the keyword score assigned to Keyword 1 116 for Category 1 310 would be:

$$KS(1)_{C1N1} = DF_{C1} * CS_{C1N1} / KC_{N1} = 0.2 * 10/2 = 1.0$$

As will be appreciated, the above equation accounts for only the first instance of each unique keyword found in a node. On other embodiments, the equation may be modified to account for recurring uses of the same keyword in a node, for example assigning a weight to each keyword based on its frequency of occurrence in a node.

At step 508, a determination is made as to whether there is another content category for which to calculate a keyword score for the selected keyword. If so, the method returns to step 504 for selection of another content category and processing is repeated from there, for the new content category, as described above. In our example, Node 1 101 has a seed node score of 0 for Category 2 311 and Category 3 312, so the keyword scores $KS(1)_{C2N1}$ and $KS(1)_{C3N1}$ will both be 0. The keyword score assigned to Keyword 1 116 in Node 1 101 for Category 4 313 would be:

$$KS(1)_{C4N1} = DF_{C4} * CS_{C1N1} / KC_{N1} = 0.5 * 6/2 = 1.5$$

When it is determined at step 508 that there is no other content category for which to calculate a keyword score for the selected keyword, the method proceeds to step 510, where a determination is made as to whether there is another unique keyword in the seed node. If there is another unique keyword in the seed node, the method returns to step 502 for selection of another keyword and processing is repeated from there, for the new keyword, as described above. When it is determined at step 510 that there is no other unique keyword in the node, the exemplary method ends at step 512. Following the previous example, the keyword scores for Node 1 101 are shown in Table 2 below.

TABLE 2

Keyword Scores for Node 1

|  | KS(1) | KS(2) | KS(3) | KS(4) |
|---|---|---|---|---|
| Category 1 | 1.0 | 1.0 | 0 | 0 |
| Category 2 | 0 | 0 | 0 | 0 |
| Category 3 | 0 | 0 | 0 | 0 |
| Category 4 | 1.5 | 1.5 | 0 | 0 |

Returning to FIG. 4, after determining keyword scores for the selected seed node, a determination is made at step 412 as to whether there is another seed node in the linked database for which seed node scores need to be assigned. If so, the method returns to step 406 for selection of another seed node and processing continues from there, for the new seed node, as described above. When it is determined at step 412 that there is no other seed node to be processed, the method advances to step 414 where the keyword scores for each seed document are aggregated per content category. In other words, if multiple seed nodes contain the same keyword, the corresponding keyword scores in each content category are added together to calculate an aggregate keyword score for each content category, as follows:

$$KS(i)_{Ci} = KS(i)_{Ci\,Ni} + \ldots KS(n)_{CiNn}$$

where $KS(i)_{Ci}$ is the aggregate keyword score for the selected content category and $KS(i)_{CiNi}$ to $KS(n)_{CiNn}$ are the keyword scores assigned to each keyword of each seed node for the selected content category. Accordingly, the aggregate keyword score for each content category is affected every time a new seed node is specified. In the example used herein, Node 1 101 is the only seed node, meaning that there is no need to aggregate keyword scores of multiple seed nodes.

At step 416, a branch node is selected from the linked database. In certain embodiments, any node that is not a seed node may be treated as a branch node. At step 418, a branch node score is determined for the selected branch node for each content category. An exemplary method for performing step 418 is illustrated in FIG. 6.

Figure 6:
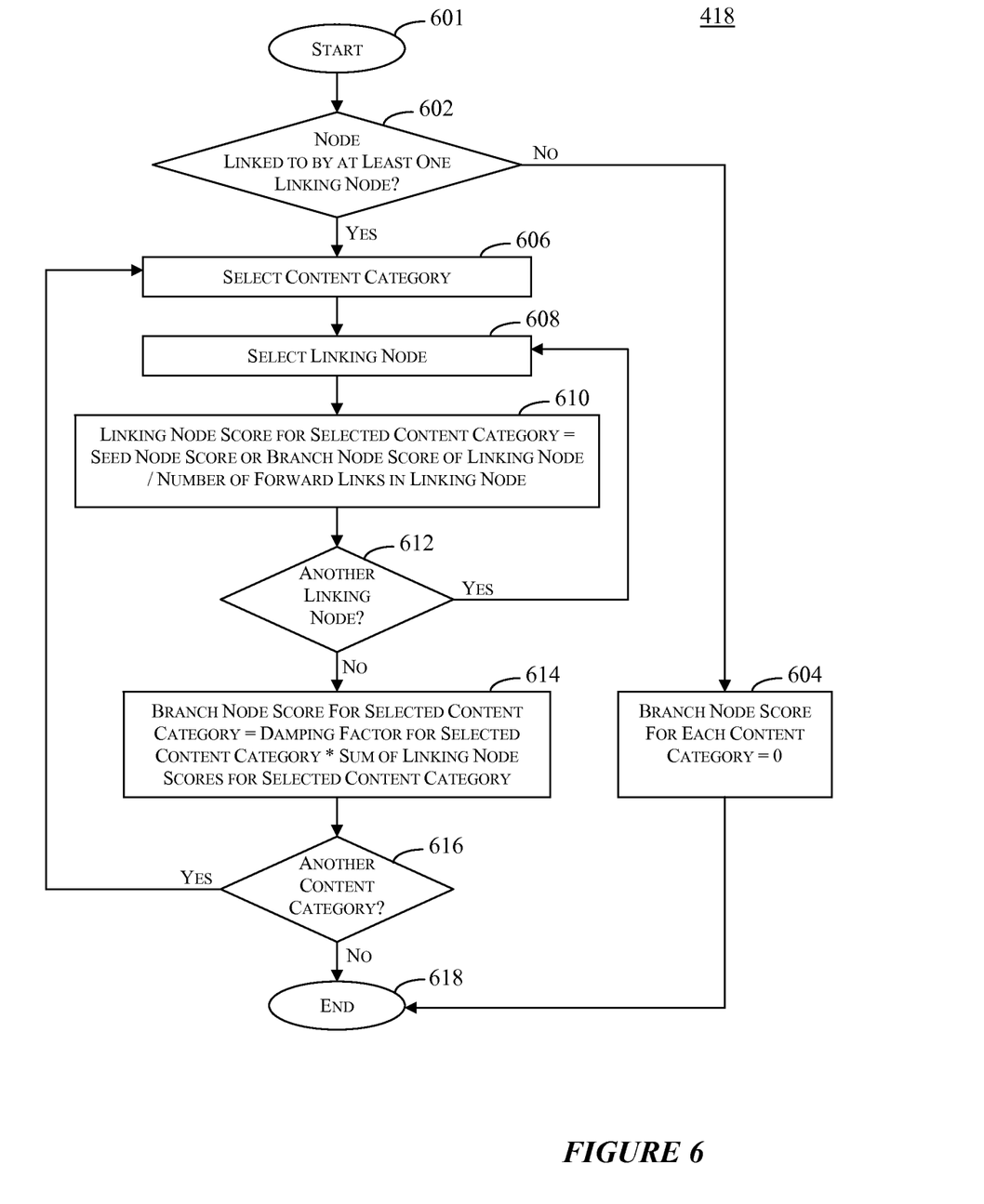
FIG. 6 is a flow chart illustrating an exemplary method for determining branch node scores for a branch node, in accordance with certain embodiments of the present invention.

The exemplary method of FIG. 6 begins at step 601 and proceeds to step 602, where a determination is made as to whether the branch node is linked to by at least one linking node. If the branch node is not linked to by at least one linking node (i.e., the branch node has no backward links), the method advances to step 604, where the branch node score for each content category is set to 0. However, if the branch node is linked to by at least one linking node (i.e., the branch node has at least one backward link), the method proceeds to step 606, where a content category is selected. After selection of the first content category, a linking node is selected at step 608. Then at step 610 a linking node score is determined for the selected linking node. In certain embodiments, the linking node score for the selected content category is equal to the seed node score (if the linking node is a seed node) or branch node score (if the linking node is a branch node) of the linking node divided by the number of forward links in the linking node. Generally, the following equation can be used to calculate linking node scores for selected content categories:

$$LN_{iCi} = CS_{CiNi}/FL_{Ni}$$

where $LN_{iCi}$ is the linking node score of the selected linking node for the selected content category, $CS_{CiNi}$ is the seed node score or the branch node score, as applicable, of the selected linking node for the selected content category, and $FL_{Ni}$ is the number of forward links in the selected linking node. So, assuming that Node 2 102 is the selected branch node, the linking node score assigned to Node 1 101 (the only node in our example that links to Node 2 102) for Category 1 310 would be:

$$LN_{1C1} = CS_{C1N1}/FL_{N1} = 10/3 = 3.33$$

At step 612 a determination is made as to whether another linking node points to the branch node under consideration (i.e., whether the selected branch node has other backward links). If so, the method returns to step 608 for selection of another linking node and processing is repeated, for the new linking node, as previously described. When it is determined at step 612 that no other linking node points to the branch node under consideration, the method moves to step 614 for determination of the branch node score for the selected content category. In certain embodiments, the branch node score for selected content category is equal to the damping factor for the selected content category multiplied by the sum of the linking node scores for the selected content category, as follows:

$$CS_{CiNi} = DF_{Ci} * (LN_{iCi} + \ldots LN_{nCi})$$

where $CS_{CiNi}$ is the branch node score for the selected content category, $DF_{Ci}$ is the damping factor for the selected content category and $LN_{iCi} + \ldots LN_{nCi}$ are the linking node scores for all linking nodes that link to the branch node. Following the above example, the branch score assigned to Node 2 102 for Category 2 311 would be:

$$CS_{C1N2} = DF_{C1} * (LN_{1C1} + 0) = 0.2 * (3.33) = 0.66$$

At step 616, a determination is made as to whether there is another content category for which a branch node score needs to be assigned for the selected branch node. If so, the method returns to step 606 for selection of another content category and processing continues from there, for the new content category, as described above. When it is determined at step 616 that there is no other content category to be selected, the exemplary method ends at step 618. Iterating through our example, the only linking node, Node 1 101, has a seed node score of 0 for Category 2 311 and Category 3 312, so its linking node scores $LN_{1C2}$ and $LN_{1C3}$ will both be 0. As a result the branch node scores $CS_{C2N2}$ and $CS_{C3N2}$ for Node 2 102 will both be 0. The linking node score $LN_{1C4}$ assigned to Node 1 101 for Category 4 313 would be:

$$LN_{1C4} = CS_{C4N1}/FL_{N1} = 6/3 = 2$$

and the branch node score assigned to Node 2 102 for Category 4 313 would be:

$$CS_{C4N2} = DF_{C4} * (LN_{1C4} + 0) = 0.5 * (2) = 1.0$$

Returning to FIG. 4, after determining the branch node scores for the selected branch node, the exemplary method moves to step 420. In step 420, if a branch node score assigned to the selected branch node does not exceed a configurable threshold value, it is replaced by a leaf node score. In certain embodiments, this replacement may be done on a category-by-category basis. In other words, if a branch node score for a particular category does not exceed the threshold value it is replaced by a leaf node score, but other branch node scores exceeding the threshold value are not replaced by leaf nodes. Alternatively, if a branch node score for any category does not exceed the threshold value, all branch node scores assigned to the branch node may be replaced by leaf node scores. The threshold value may be configured (e.g., by a system administrator or other user) to be any value (e.g., 0.1, 0.2, etc.) below which a branch node score is considered to be "too low" or of relatively little meaning.

Figure 7:
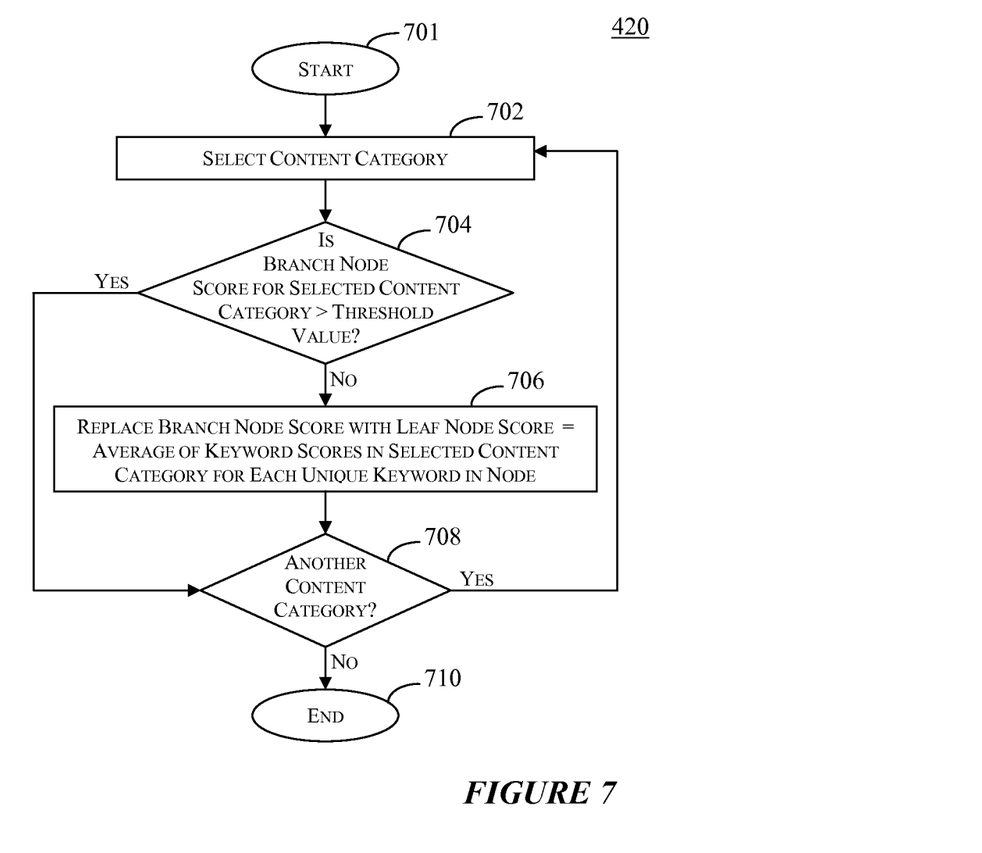
FIG. 7 is a flow chart illustrating an exemplary method for determining leaf node scores for a leaf node, in accordance with certain embodiments of the present invention.

An exemplary method for performing step 420 is illustrated in FIG. 7. The exemplary method of FIG. 7 begins at step 701 and proceeds to step 702, where a content category is selected. At step 704, a determination is made as to whether the branch node score for the selected content category exceeds a threshold value. If not, the branch node is treated as a leaf node and the branch node score is replaced with a leaf node score at step 706. In certain embodiments, the leaf node score may be calculated as the average of all keyword scores for the selected content category assigned to the keywords appearing in the leaf node, as follows:

$$CS_{CiNi}=(KS(i)_{Ci}\ldots+KS(n)_{Ci})/KC_{Ni}$$

where, $CS_{CiNi}$ is the leaf node score assigned to the leaf node for the selected content category, $KS(i)_{Ci}$ to $KS(n)_{Ci}$ are the keyword scores assigned to the keywords appearing in the leaf node for the selected content category (derived from the seed nodes, as discussed with reference to step 410) and $KC_{Ni}$ is the keyword count for the leaf node.

In the example described herein, assuming a threshold value of 0.1, the branch node scores for Node 2 102 in Category 2 311 and Category 3 312 would not exceed the threshold ($CS_{C2N2}=0$, $CS_{C3N2}=0$) and could be treated as leaf nodes. In this case, however, all keyword scores for Category 2 311 and Category 3 312 are also zero (see Table 2), meaning that the leaf node scores for those categories would also be zero.

At step 708, a determination is made as to whether there is another content category for which a branch node score has been assigned for the selected branch node. If so, the method returns to step 702 for selection of another content category and processing continues from there, for the new content category, as described above. When it is determined at step 708 that there is no other content category to be selected, the exemplary method ends at step 710.

Returning to FIG. 4, after determining the branch node scores and/or leaf node scores for the selected branch node, a determination is made at step 422 as to whether there is another branch node in the linked database for which branch node scores need to be assigned. If so, the method returns to step 416 for selection of another branch node and processing continues from there, for the new branch node, as described above. Thus, according to our example, the above process would be repeated for Node 3 103 and Node 4 104. Node 3 103 has two linking nodes, Node 1 101 and Node 4 104. Linking node scores for Node 1 101 have already been calculated. To solve for the linking node scores for Node 4 104, the branch node scores $CS_{CiN4}$ for Node 4 104 will need to be known or may be temporarily set to zero (e.g., until a next iteration when they are known).

Due to the simplicity of our example, we can determine the branch node scores for Node 4 104 before we determine the branch node scores for Node 3 103 (i.e., because the branch node scores for Node 3 103 depend only on Node 1 101, for which the seed node scores have already been determined.) Again, the linking node scores for Node 1 101 would be as follows:

$$LN_{1C1}=CS_{C1N1}/FL_{N1}=3.33$$

$$LN_{1C2}=CS_{C2N1}/FL_{N1}=0$$

$$LN_{1C3}=CS_{C3N1}/FL_{N1}=0$$

$$LN_{1C4}=CS_{C4N1}/FL_{N1}=2$$

Accordingly, the branch node scores for Node 4 104 would be as follows:

$$CS_{C1N4}=DF_{C1}*(LN_{1C1})=0.2*(3.33)=0.66$$

$$CS_{C2N4}=DF_{C2}*(LN_{1C2})=0.5*(0)=0$$

$$CS_{C3N4}=DF_{C3}*(LN_{1C3})=0.3*(0)=0$$

$$CS_{C4N4}=DF_{C4}*(LN_{1C4})=0.5*(2)=1.0$$

Then, the linking node scores for Node 4 104 would be:

$$LN_{4C1}=CS_{C1N4}/FL_{N4}=0.66/2=0.33$$

$$LN_{4C2}=CS_{C2N4}/FL_{N4}=0/2=0$$

$$LN_{4C3}=CS_{C3N4}/FL_{N4}=0/2=0$$

$$LN_{4C4}=CS_{C4N4}/FL_{N4}=1/2=0.5$$

and the branch node scores for Node 3 103 would be as follows:

$$CS_{C1N3}=DF_{C1}*(LN_{1C1}+LN_{4C1})=0.2*(3.33+.33)=0.732$$

$$CS_{C2N3}=DF_{C2}*(LN_{1C2}+LN_{4C2})=0.5*(0+0)=0$$

$$CS_{C3N3}=DF_{C3}*(LN_{1C3}+LN_{4C3})=0.3*(0+0)=0$$

$$CS_{C4N3}=DF_{C4}*(LN_{1C4}+LN_{4C4})=0.5*(2+0.5)=1.25$$

Again, assuming a threshold value of 0.1, none of the above branch node scores for Category 1 310 or Category 4 313 would need to be replaced with a leaf node score (and leaf node scores for Category 2 311 and Category 3 312 would be 0). Accordingly, Table 3 below summarizes the branch node scores assigned to Node 2 102, Node 3 103 and Node 4 104 using the above equations.

TABLE 3

| | Branch Node Scores | | | |
| --- | --- | --- | --- | --- |
| | Category 1 | Category 2 | Category 3 | Category 4 |
| Node 2 | .66 | 0 | 0 | 1.0 |
| Node 3 | .732 | 0 | 0 | 1.25 |
| Node 4 | .66 | 0 | 0 | 1.0 |

When it is determined at step 422 that there is no other branch node to be processed, the exemplary method 400 ends at step 424. When employed as an iterative process, the exemplary method 400 will result in continuous refinements to the calculated seed node scores, branch node scores and leaf node scores. Accordingly, in some embodiments, the exemplary method 400 is run on a substantially continuous or periodic basis, to account for changes made to the underlying linked database. The content category scores resulting from the methods described herein can be used for filtration, categorization, and relevancy lookups.

Those skilled in the art will appreciate that the methods described herein with respect to FIGS. 4-7 are provided by way of example only and that, for each such method, other steps and/or sequences of steps may be performed. Furthermore, the equations described herein for calculating branch node scores, linking node scores, leaf node scores and keyword scores are also provided by way of example only. Modifications may be made to any of those equations without departing from the spirit and scope of the present invention.

Based on the foregoing, it can be seen that the present invention provides novel systems, methods and computer program products for assigning content category scores to nodes in a linked database. A node in a linked database may be linked to by a plurality of linking nodes. In general terms, the present invention involves assigning to each linking node a linking node score for each of a plurality of content categories. The linking node score for each content category represents a degree of relevancy of the linking node to the content category. The linked node is then assigned a content category score for each of the plurality of content categories, which is based on each linking node score for said content category.

Many other modifications, features and embodiments of the present invention will become evident to those of skill in the art. For example, rather the relatively simple equations described herein, a network analysis type matrix could be used to calculate the content category scores for a particular node. As another example, the damping factor for a content category could be allowed to change over time depending on the quantity of nodes considered to be contained in the database and included in that category. Furthermore, the process used for scoring leaf nodes based on average keyword scores could be applied to all branch nodes and used as a base or initial content category score that can be amplified by the above-described method for determining branch node scores. Also, in certain alternative embodiments, a content category score may be increased for nodes whose backward links are maintained by entities (e.g., companies or institutions) or authors considered relevant to the applicable content category.

Accordingly, it should be understood that the foregoing relates only to certain embodiments of the invention, which are presented by way of example rather than limitation. Numerous changes may be made to the embodiments described herein without departing from the spirit and scope of the invention as defined by the following claims.

What is claimed is:

1. An information retrieval system comprising a processor for executing at least one program module for scoring nodes in a linked database based on a plurality of content categories, said nodes including linking nodes and linked nodes, wherein at least one of the linking nodes is a seed node, the seed node having an assigned seed node score for each content category, said at least one program module being stored in a system memory and comprising computer-executable instructions for:
    identifying a plurality of linking nodes in the linked database and assigning to each linking node a linking node score for each content category, wherein the linking node score for each content category represents a degree of relevancy of the linking node to the content category;
    identifying a plurality of linked nodes in the linked database, the linked nodes being linked to by at least one of the linking nodes;
    assigning to each linked node a content category score for each content category, wherein the content category score for each content category is based on the linking node score for said content category of each linking node that links to the linked node;
    identifying at least one unique keyword in the seed node;
    for each identified unique keyword, determining a keyword score for each content category, wherein the keyword score for each content category is based on the seed node score for said content category divided by the number of unique keywords in the seed node;
    determining that a selected content category score for a selected linked node in a selected content category does not exceed a threshold value; and
    replacing the selected content category score with a leaf node score that is based on an average of the keyword scores in the selected content category assigned to any of the unique keywords contained in the selected node.

2. The information retrieval system of claim 1, wherein the content category score for each content category is based on the sum of each linking node score for said content category multiplied by a damping factor for said content category, wherein said damping factor reduces the content category score of the linked node based on an estimated rate of irrelevancy of the nodes in the linked database to said content category.

3. The information retrieval system of claim 1, wherein the seed node contains a number of forward links; and
    wherein the linking node score assigned to the seed node for each content category is based on the seed node score assigned to said seed node for said content category divided by the number of forward links in said seed node.

4. The information retrieval system of claim 1, wherein at least one of the linking nodes is a branch node that is linked to by at least one of the other linking nodes;
    wherein the branch node contains a number of forward links and has a calculated branch node score for each content category, wherein the branch node score for each content category is based on each linking node score for said content category of the at least one other linking nodes; and
    wherein the linking node score assigned to the branch node for each content category is based on the branch node score assigned to said branch node for said content category divided by the number of forward links in said branch node.

5. An information retrieval system comprising a processor for executing at least one program module for scoring nodes in a linked database based on a plurality of content categories, said nodes including linking nodes and linked nodes, wherein a plurality of the linking nodes are seed nodes, each seed node having an assigned seed node score for each content category, wherein the at least one program module is stored in a system memory and comprises computer-executable instructions for:
    identifying a plurality of linking nodes in the linked database and assigning to each linking node a linking node score for each content category, wherein the linking node score for each content category represents a degree of relevancy of the linking node to the content category;
    identifying a plurality of linked nodes in the linked database, the linked nodes being linked to by at least one of the linking nodes;
    assigning to each linked node a content category score for each content category, wherein the content category score for each content category is based on the linking node score for said content category of each linking node that links to the linked node;
    identifying at least one unique keyword in each seed node;
    for each identified unique keyword in each seed node, determining a keyword score for each content category, wherein the keyword score for each content category is based on the seed node score for said content category divided by the number of unique keywords in the seed node;
    determining an aggregate keyword score for each content category by aggregating the keyword scores for each content category of all of the seed nodes;
    determining that a selected content category score for a selected linked node in a selected content category does not exceed a threshold value; and
    replacing the selected content category score with a leaf node score that is based on an average of the aggregate keyword scores in the selected content category assigned to any of the unique keywords contained in the node.

6. A computer implemented method for scoring a node in a linked database, the node being linked to by a plurality of linking nodes, the method comprising the steps of:
- for each linking node, determining a linking node score for each of a plurality of content categories, wherein the linking node score for each content category represents a degree of relevancy of the linking node to the content category;
- assigning to the node a content category score for each of the plurality of content categories, wherein the content category score for each content category is based on each linking node score for said content category;
- identifying a plurality of unique keyword in a seed node having an assigned seed node score for each content category;
- for each identified unique keyword, determining a keyword score for each content category, wherein the keyword score for each content category is based on the seed node score for said content category divided by the number of unique keywords in the seed node; and
- if the content category score in any content category does not exceed a threshold value, replacing said content category score with a leaf node score that is based on an average of the keyword scores in said content category assigned to any of the unique keywords contained in the node.

7. The method of claim 6, wherein the content category score for each content category is based on the sum of each linking node score for said content category multiplied by a damping factor for said content category, wherein said damping factor reduces the content category score of the linked node based on an estimated rate of irrelevancy of the nodes in the linked database to said content category.

8. The method of claim 6, wherein the seed node contains a number of forward links; and
- wherein the linking node score assigned to the seed node for each content category is based on the seed node score assigned to said seed node for said content category divided by the number of forward links in said seed node.

9. The method of claim 6, wherein at least one of the linking nodes is a branch node that is linked to by at least one of the other linking nodes;
- wherein the branch node contains a number of forward links and has a calculated branch node score for each content category, wherein the branch node score for each content category is based on each linking node score for said content category of the at least one other linking nodes; and
- wherein the linking node score assigned to the branch node for each content category is based on the branch node score assigned to said branch node for said content category divided by the number of forward links in said branch node.

10. A computer implemented method for scoring a node in a linked database, the node being linked to by a plurality of linking nodes, wherein a plurality of the linking nodes are seed nodes, each seed node having an assigned seed node score for each content category and wherein the method comprises the steps of:
- for each linking node, determining a linking node score for each of a plurality of content categories, wherein the linking node score for each content category represents a degree of relevancy of the linking node to the content category;
- assigning to the node a content category score for each of the plurality of content categories, wherein the content category score for each content category is based on each linking node score for said content category
- identifying a plurality of keywords in each seed node having an assigned seed node score;
- for each identified keyword in each seed node, determining a keyword score for each content category, wherein the keyword score for each content category is based on the seed node score for said content category divided by the number of keywords in the seed node;
- determining an aggregate keyword score for each content category by aggregating the keyword scores for each content category of all of the seed nodes; and
- if the content category score in any content category of the node does not exceed a threshold value, replacing said content category score with the leaf node score that is based on an average of the aggregate keyword scores in said content category assigned to any of the keywords contained in the node.

11. A computer program product having stored thereon at least one program module for scoring a node in a linked database, the node being linked to by a plurality of linking nodes, the at least one program module comprising computer executable instructions for:
- for each linking node, determining a linking node score for each of a plurality of content categories, wherein the linking node score for each content category represents a degree of relevancy of the linking node to the content category;
- assigning to the node a content category score for each of the plurality of content categories, wherein the content category score for each content category is based on each linking node score for said content category;
- identifying a plurality of unique keyword in a seed node having an assigned seed node score;
- for each identified unique keyword, determining a keyword score for each content category, wherein the keyword score for each content category is based on the seed node score for said content category divided by the number of unique keywords in the seed node; and
- if the content category score in any content category does not exceed a threshold value, replacing said content category score with a leaf node score that is based on an average of the keyword scores in said content category assigned to any of the unique keywords contained in the node.

12. The computer program product of claim 11, wherein the content category score for each content category is based on the sum of each linking node score for said content category multiplied by a damping factor for said content category, wherein said damping factor reduces the content category score of the linked node based on an estimated rate of irrelevancy of the nodes in the linked database to said content category.

13. The computer program product of claim 11, wherein the seed node contains a number of forward links; and
- wherein the linking node score assigned to the seed node for each content category is based on the seed node score assigned to said seed node for said content category divided by the number of forward links in said seed node.

14. The computer program product of claim 11, wherein at least one of the linking nodes is a branch node that is linked to by at least one of the other linking nodes;
- wherein the branch node contains a number of forward links and has a calculated branch node score for each content category, wherein the branch node score for each content category is based on each linking node score for said content category of the at least one other linking nodes; and wherein the linking node score assigned to the branch node for each content category is based on the branch node score assigned to said branch node for said content category divided by the number of forward links in said branch node.

15. A computer program product having stored thereon at least one program module for scoring a node in a linked database, the node being linked to by a plurality of linking nodes, wherein a plurality of the linking nodes are seed nodes, each seed node having an assigned seed node score for each content category and wherein the at least one program module comprises computer executable instructions for:

for each linking node, determining a linking node score for each of a plurality of content categories, wherein the linking node score for each content category represents a degree of relevancy of the linking node to the content category;

assigning to the node a content category score for each of the plurality of content categories, wherein the content category score for each content category is based on each linking node score for said content category;

identifying a plurality of keywords in each seed node having an assigned seed node score;

for each identified keyword in each seed node, determining a keyword score for each content category, wherein the keyword score for each content category is based on the seed node score for said content category divided by the number of keywords in the seed node;

determining an aggregate keyword score for each content category by aggregating the keyword scores for each content category of all of the seed nodes; and if the content category score in any content category of the node does not exceed a threshold value, replacing said content category score with the leaf node score that is based on an average of the aggregate keyword scores in said content category assigned to any of the keywords contained in the node.

* * * * *